(12) United States Patent
Mitchell et al.

(10) Patent No.: US 6,267,837 B1
(45) Date of Patent: Jul. 31, 2001

(54) METHOD OF MAKING CONTAINER WITH INSULATING STOCK MATERIAL

(75) Inventors: Richard P. Mitchell; Gerald John Van Handel, both of Neenah; Galyn A. Schulz, Greenville, all of WI (US)

(73) Assignee: Fort James Corporation, Deerfield, IL (US)

(*) Notice: Subject to any disclaimer, the term of this patent is extended or adjusted under 35 U.S.C. 154(b) by 0 days.

(21) Appl. No.: 09/372,585

(22) Filed: Aug. 12, 1999

Related U.S. Application Data

(60) Division of application No. 09/047,532, filed on Mar. 25, 1998, which is a continuation-in-part of application No. 08/825,021, filed on Mar. 26, 1997, now abandoned.

(51) Int. Cl.[7] .................................................. B32B 1/02
(52) U.S. Cl. .................... 156/209; 156/219; 156/290; 156/292; 493/110; 493/903
(58) Field of Search .................................... 156/290, 209, 156/219, 308.4, 244.27, 292; 220/592.2, 592.26, 592.16, 592.17, 62.12; 229/403, 5.84; 493/85, 110, 128, 903

(56) References Cited

U.S. PATENT DOCUMENTS

| Re. 25,618 | 7/1964 | Goodman . |
| 2,266,828 | 12/1941 | Sykes . |
| 2,563,352 | 8/1951 | Morse . |
| 2,853,222 | 9/1958 | Gallagher . |
| 3,082,900 | 3/1963 | Goodman . |
| 3,141,913 * | 7/1964 | Edwards ............................. 264/210 |
| 3,220,595 | 11/1965 | Edwards . |
| 3,509,005 | 4/1970 | Hartig . |
| 3,908,523 | 9/1975 | Shikaya . |
| 4,288,026 | 9/1981 | Wilhelm . |
| 4,313,993 | 2/1982 | McGlory . |
| 4,349,124 * | 9/1982 | Faller .................................. 220/453 |
| 4,993,580 | 2/1991 | Smith . |
| 5,092,485 | 3/1992 | Lee . |
| 5,128,182 | 7/1992 | Bunker et al. . |
| 5,205,473 | 4/1993 | Coffin, Sr. . |
| 5,226,585 | 7/1993 | Varano . |
| 5,308,678 | 5/1994 | Tsujimura et al. . |
| 5,326,019 | 7/1994 | Wolff . |
| 5,363,982 | 11/1994 | Sadlier . |
| 5,460,323 | 10/1995 | Titus . |
| 5,490,631 * | 2/1996 | Iioka et al. .......................... 229/403 |
| 5,820,016 * | 10/1998 | Stropkay ............................. 229/403 |
| 5,840,139 * | 11/1998 | Geddes et al. ....................... 156/79 |

* cited by examiner

Primary Examiner—Michael W. Ball
Assistant Examiner—Todd Kilkenny
(74) Attorney, Agent, or Firm—Nixon Peabody LLP; Donald R. Studebaker

(57) ABSTRACT

An insulating paperboard container is disclosed including a container body having a side wall and a bottom wall with the one side wall including a base layer and an insulating layer on at least a portion of the base layer, preferably on an inside surface of the side wall. The insulating layer being selectively adhered to at least a portion of the base layer such that the selective adhering of the insulating layer to the base layer creates air pockets between the insulating layer and the base layer with the air pockets being expandable in response to contact with a heated liquid. Such a container is formed from an insulating stock material comprising a paperboard base layer and an insulating layer overlying at least a portion of at least of one surface of the base layer with the insulating layer being selectively adhered to the surface of the base layer forming enclosed regions between the base layer and the insulating layer. In order to ensure the formation of pronounced air pockets between the insulating layer and the base layer, the paperboard base layer may be debossed, creating debossed regions with the insulating layer being adhered over the openings of the debossed regions.

4 Claims, 4 Drawing Sheets

METHOD OF MAKING CONTAINER WITH INSULATING STOCK MATERIAL

This application is a Divisional application of Ser. No. 09/047,532 filed Mar. 25, 1998; which itself is a Continuation-in-Part of Ser. No. 08/825,021, filed Mar. 26, 1997 now abandoned.

TECHNICAL FIELD OF THE INVENTION

The present invention relates to heat-insulating stock material and methods for producing the stock material and containers. More particularly, the present invention is directed to the formation of insulating stock material formed by selectively adhering a polymer film to a paperboard substrate and forming containers from the insulating stock material.

BACKGROUND OF THE INVENTION

Several types of heat-insulating containers have been used commercially to pack hot liquids. A polystyrene foam heat-insulating container is one example. It is prepared by casting unfoamed polystyrene into a mold, heating the resin under pressure to foam it, and removing the foamed resin from the mold. Alternatively, a foamed styrene sheet may be shaped into a container. An initial drawback of these types of containers is that their insulating characteristics are so efficient that the consumer can be lulled into a false sense of security because the outside of the cup is not hot while the temperature of the contents remain scalding. The container thus produced has outstanding heat-insulating properties but, on the other hand, it needs reconsideration from the viewpoint of saving petroleum resources or increasing the efficiency of incinerating waste containers. As a further problem, a slow, inefficient and high waste printing process is required to print on the outer surfaces of polystyrene foam heat-insulating containers since printing can only be effected after individual cups have been shaped. Further, the tapered surface of the container contributes to print blur at positions near the top and bottom of the container unless specialized and expensive printing technology is employed. As a further disadvantage, the outer surface of the foamed styrene heat-insulating container is often not sufficiently smooth to accept high resolution screen printing further affecting printability. Thus, the polystyrene foam containers suffer the disadvantage of low printability.

The conventional paper heat-insulating container can not be manufactured at low cost, and one reason is the complexity of the manufacturing process. One example is a container wherein the side wall of the body member is surrounded by a corrugated heat-insulating jacket. The process of manufacturing such containers involves additional steps of forming the corrugated jacket and bonding it to the outer surface of the side wall of the body member. One defect of this type of container is that letters, figures or other symbols are printed on the corrugated surface and the resulting deformed letters or patterns do not have aesthetic appeal to consumers. Another defect is that the jacket is bonded to the side wall of the body member in such a manner that only the valley ridges contact the side wall, and the bond between the jacket and the side wall is so weak that the two can easily separate. Often times, corrugated containers are not suitable for stacking and thus require large storage space.

U.S. Pat. No. 4,435,344 issued to Jioka teaches a heat-insulating paper container consisting of a body member and a bottom panel member, characterized in that at least one surface of the body member is coated or laminated with a foamed heat-insulating layer of a thermoplastic synthetic resin film whereas the other surface of the body member is coated or laminated with a thermoplastic synthetic resin film, a foamed heat-insulating layer of thermoplastic synthetic resin film or an aluminum foil. When manufacturing such a container, the water in the paper is vaporized upon heating, causing the thermoplastic synthetic resin film on the surface to foam. The container under consideration has the advantage that it exhibits fairly good heat-insulating properties and that it can be manufactured at low cost by a simple process. However, the thermoplastic synthetic resin film will not foam adequately if the water content in the paper is low. While high water content is advantageous for the purpose of film foaming, the mechanical strength of the container may deteriorate. Moreover, even if successful foaming is done, the thickness of the foam layer is uniform and cannot be controlled from one portion of the container to another. Further, the foam layer reaches an expansion limit regardless of the moisture content of the base layer.

In an effort to overcome the aforementioned shortcomings, U.S. Pat. No, 5,490,631 issued to jioka discloses a heat-insulating paper container including a body wherein part of the outer surface of the body members provided with a printing of an organic solvent based ink. The body portion is subsequently coated with a thermoplastic synthetic resin film which when heated forms a thick foamed heat-insulating layer in the printed area of the outer surface whereas a less thick foamed heat-insulating layer is formed in the non-printed areas. Further, there are portions of the outer surface which remain unfoamed. In manufacturing a container in this manner, the printing is carried out on the paperboard layer and consequently viewing of the printed matter by the consumer is obstructed by the foamed insulating layer. Moreover, because the foamed layer overlying the printed areas are thicker than the remaining portions of the foamed layers, these areas will be even more obstructed. Consequently, this container suffers from similar drawbacks as those containers discussed hereinabove.

Another type of paper heat-insulating container has a "dual" structure wherein an inner cup is given a different taper than an outer cup to form a heat-insulating air layer. The two cups are made integral by curling their respective upper portions into a rim. The side wall of the outer cup is flat and has high printability, however, the two cups may easily separate. Another disadvantage is that the dual structure increases the manufacturing cost and thus the unit cost of the container. Moreover, the dual cup construction increases the stacking height of the cups and consequently increases packaging and shipping costs.

Accordingly, there is a need for insulated stock material and containers wherein the stock material can be manufactured in an economical manner such that the resultant containers formed from the insulating stock material provide the requisite insulating properties while readily receiving printed matter on the outer surface of the material.

SUMMARY OF THE INVENTION

A primary object of the present invention is to overcome the aforementioned shortcomings associated with the containers discussed hereinabove.

A further object of the present invention is to provide a heat insulating stock material which may be economically manufactured and readily formed into containers for receiving a hot liquid.

Yet another object of the present invention is to provide a decorative heat-insulating container and stock material for forming the same wherein the outer surface of the insulating material readily receives printed indicia.

Yet another object of the present invention is to provide a heat insulating container including a plurality of pockets which readily expand in response to a hot liquid being placed in the container thereby forming an insulating barrier between the hot liquid and the consumer.

Still another object of the present invention is to provide methods of forming the heat insulating stock material in a manner which adds little to the overall cost associated with the formation of such containers.

A still further object of the present invention is to provide a heat insulating container and stock material for forming the same which includes not only enhanced insulating characteristics but which provides for little increase in the stacking height of the containers.

These as well as additional advantages of the present invention are achieved by forming an insulating container comprising a container body having a side wall and a bottom wall with the one side wall including a base layer and an insulating layer on at least a portion of the base layer, preferably on an inside surface of the side wall. The insulating layer being selectively adhered to at least a portion of the base layer such that the selective adhering of the insulating layer to the base layer creates air pockets between the insulating layer and the base layer with the air pockets being expandable in response to contact with a heated liquid. Such a container is formed from an insulating stock material comprising a paperboard base layer and an insulating layer overlying at least a portion of at least of one surface of the base layer with the insulating layer being selectively adhered to the surface of the base layer forming enclosed regions between the base layer and the insulating layer. In order to ensure the formation of pronounced air pockets between the insulating layer and the base layer, the paperboard base layer may be debossed, creating debossed regions with the insulating layer being adhered over the openings of the debossed regions.

These as well as additional advantages of the present invention will become apparent from the following detailed description when read in light of the several figures.

DETAILED DESCRIPTION OF THE INVENTION

Figure 1:
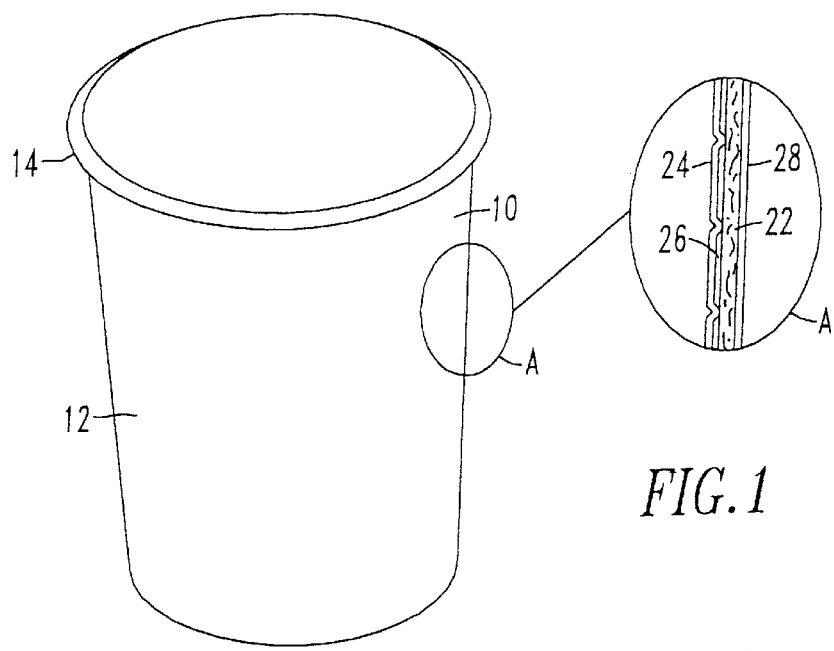
FIG. 1 is a partial cross-sectional view of a container formed in accordance with the present invention.

Referring now to the several figures, the present invention will now be described in greater detail hereinbelow. When referring to the several figures, like reference numerals will be used to refer to like elements throughout the description.

Figure 3:
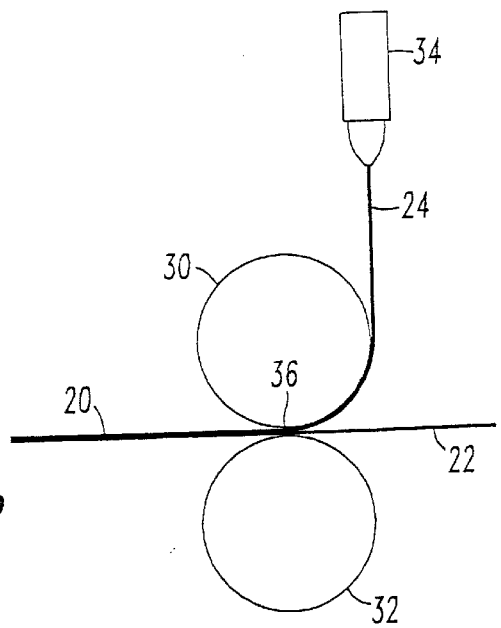
FIG. 3 is a schematic representation of the method used in forming the stock material of FIG. 2.
Figure 2:
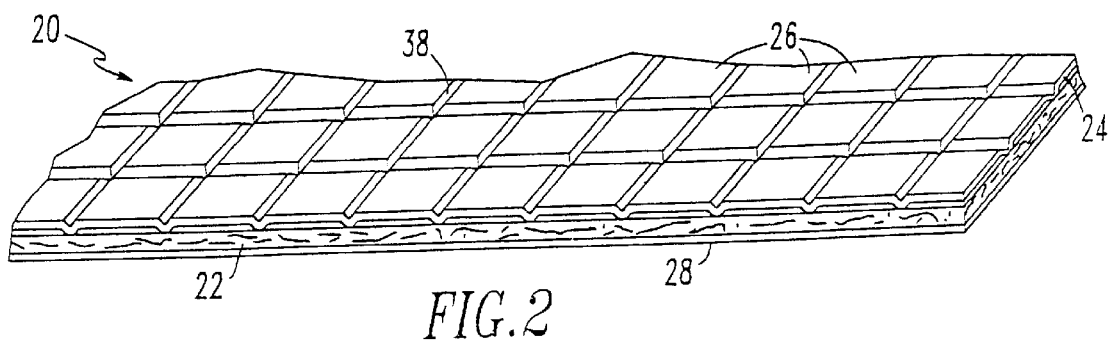
FIG. 2 is a cross-sectional perspective view of stock material which may be used to form the container of FIG. 1 in accordance with one aspect of the present invention.

Referring now to FIGS. 1, 2 and 3, the initial embodiment of the present invention will be described in detail. As noted hereinabove, the present invention is directed to the formation of heat insulating containers and more particularly to the formation of an insulating stock material formed by selectively adhering a polymer film to a paperboard substrate and subsequently forming containers from the insulating stock material. Referring to FIG. 1, a container in the form of a conventional cup 10 is illustrated including a side wall 12 tapering slightly inwardly from an upper perimeter thereof to the bottom of the container. About the upper periphery of the container 10 is a brim curl 14 which aids in the consumption of the contents of the container. Secured to the bottom portion of the cylindrical side wall 12 is a bottom wall which may be secured to the cylindrical side wall 12 in a conventional manner.

Particularly with respect to the present invention, the container 10 is formed of a heat insulating stock material particularly illustrated in FIG. 2. The heat insulating stock material 20 includes a base layer 22 formed of a paperboard material and a polymer film 24 which is selectively adhered to the surface of the paperboard substrate 22. The particular sealing of the polymer film 24 to the paperboard substrate 22 will be discussed in greater detail hereinbelow with respect to the method of forming the heat insulating stock material, however, as can be seen from FIG. 2, the sealing of the polymer film 24 to the paperboard substrate 22 is carried out in a manner which presents a plurality of enclosed regions 26 which entrap air within the regions. As will be discussed in greater detail hereinbelow upon contact with a hot liquid, the enclosed regions 26 expand to form a heat insulating barrier between the hot liquid and the consumer. With respect to the several figures, the dimensions of the air pockets are exaggerated for clarity as well as the thickness of the material layers.

Provided on an opposing surface of the paperboard substrate 22 is a moisture and air impermeable coating 28 which is presently applied to paperboard containers in a conventional manner. As can be seen from FIG. 2, the polymer film 24 is pattern heat sealed to the surface of the paperboard substrate 22 thereby providing the enclosed regions 26. It should be noted that the pattern may take on any configuration so long as a plurality of enclosed regions are formed.

With reference to FIG. 3, a schematic representation of the method of forming the heat insulating stock material 20 is illustrated. Therein, the paperboard substrate 22 is provided between a metal chill roll 30 and a rubber back-up roll 32. The polymer sheet 24 may be provided in any conventional manner with an extruder 34 being illustrated in FIG. 3. When being extruded, the polymer film 24 and preferably a polyethylene film may pass over additional chill rolls (not shown) if necessary prior to being directed to a nip region 36 between the metal chill roll 30 and back-up roll 32. Preferably, the metal chill roll 30 includes a raised pattern which forms the pressure nip region 36 and seals the softened polymer film 24 to the paperboard substrate 22 at a high pressure which thereby forms the enclosed regions 26. It should be noted that the paperboard substrate is previously coated with the impermeable coating 28 prior to being brought to the nip region 36 between the metal chill roll 30 and the back-up roll 32. It should also be noted that while the impermeable coating 28 is illustrated as being applied to an opposing surface of the paperboard substrate 22 from the polymer film 24, the impervious coating 28 may be applied to the same surface of the paperboard substrate 22 and underlie the polymer film 24. This feature will be discussed in greater detail hereinbelow with respect to the embodiment illustrated in FIGS. 4-6. The impervious coating 28 aids in maintaining the air within the enclosed regions 26.

As noted hereinabove, the metal chill roll 30 includes raised areas (not shown) which form the pattern illustrated in FIG. 2. These raised areas provide a high pressure bond between the polymer film 24 and the paperboard substrate 22 in the nip region 36 formed between the patterned metal chill roll 30 and rubber back-up roll 32. Accordingly, the polymer material which is not under high pressure due to the raised areas of the patterned metal chill roll 30 will not adhere to the paperboard substrate 22 and thus form the above-noted enclosed regions 26. The degree of adhesion between the polymer film 24 and the paperboard substrate 22 in the sealed areas 38 may be controlled by a number of factors. Particularly, the temperature of the polymer film being extruded from the extruder 34, the position of the extruded polymer film 24 with respect to the nip region 36 between the metal chill roll 30 and the rubber back-up roll 32, the nip pressure applied in the nip region 36, the particular temperature of the chill roll, the type of polymer material used, the surface treatment of the paperboard as well as the atmosphere surrounding the nip region 36. All of these factors must be taken into account when adhering the polymer film 24 to the paperboard substrate 22. Particularly, the polymer film 24 cannot be of a temperature which would permit the entire polymer film 24 to inadvertently adhere to the paperboard substrate 22 which would have the effect of eliminating the enclosed regions 26. Moreover, the adhesion between the polymer film 24 and the paperboard substrate 22 in the sealed areas 38 must be controlled so as to properly adhere the polymer film 24 to the paperboard substrate 22 so as to ensure the formation of the enclosed regions 26 which retain a sufficient amount of air.

Alternatively, the rubber back-up roll 32 may include raised areas thus applying pressure in the nip region 36 in selected areas. Further, both the metal roll 30 and the rubber back-up roll 32 may include such raised areas. The particular pattern formed in each roll will be dependent on the intended use of the insulating stock material. With respect to the rubber back-up roll 32, it is necessary that the roll be of sufficient hardness to receive and maintain the pattern when under pressure in the nip region 36. In that forming the pattern in the rubber back-up roll by laser engraving or other means is easier and less expensive than forming such pattern in a metal roll, the costs associated with the entire process may be reduced by using patterned rubber back-up rolls.

When the heat insulating stock material 20 is exposed to heat such as when the stock material is utilized to form the container 10 as illustrated in FIG. 1 and the container is filled with a hot liquid, the unbonded areas of the polymer film 24 of each of the enclosed regions 26 will expand with the expansion of the air provided in the air space between the paperboard substrate 22 and the polymer film 24 in the enclosed regions 26 along the inside wall of the container 10. This expansion provides heat insulating characteristics which maintains an outer surface of the container 10 at an acceptable temperature level even though the contents the container may reach a temperature as high as 180–200° F. It should be noted that the container 10 can be formed from the insulating stock material such that the polymer film 24 and consequently the enclosed regions 26 are on an outside surface of the container 10.

Figure 4:
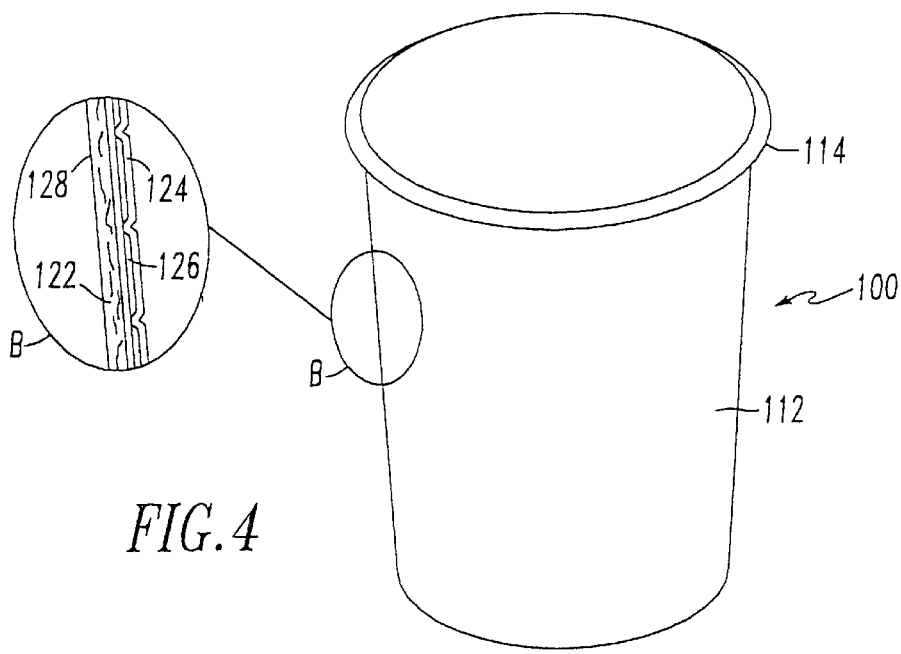
FIG. 4 is a partial cross-sectional view of a container formed in accordance with an alternative embodiment of the present invention.
Figure 6:
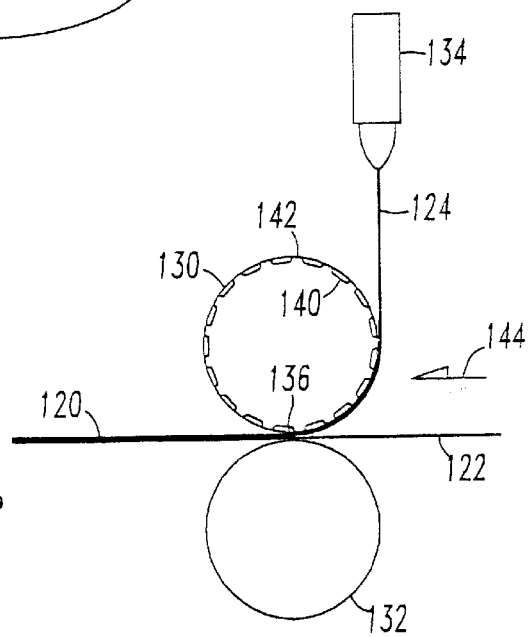
FIG. 6 is a schematic representation of the method used in forming the stock material of FIG. 5.
Figure 5:
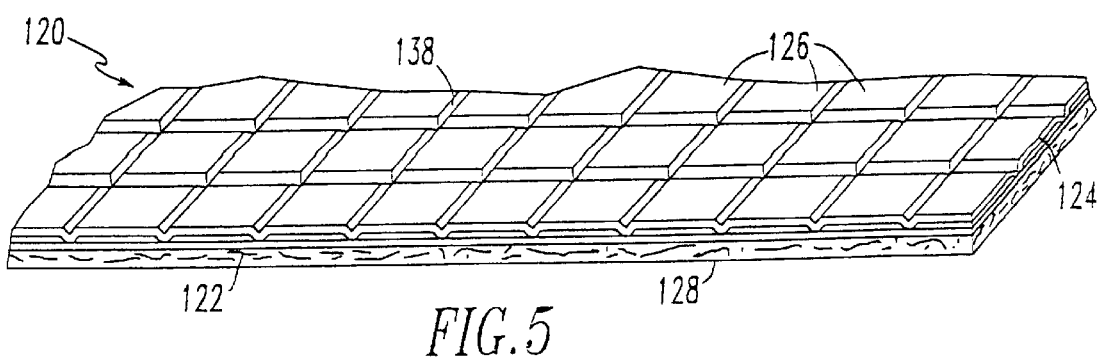
FIG. 5 is a cross-sectional perspective view of the stock material for manufacturing the container of FIG. 4 in accordance with the present invention.

With reference now to FIGS. 4–6, a container substantially identical to that illustrated in FIG. 1 is set forth with the exception of the formation of larger enclosed air space regions. As with the previous embodiment, the container 100 is formed of a heat insulating stock material formed by selectively adhering a polymer film to a paperboard substrate and subsequently forming such containers from the heat insulating stock material. Referring to FIG. 4, as with the previous embodiment, the container includes a side wall 112 tapering slightly inwardly from an upper perimeter thereof to the bottom of the container. About the upper periphery of the container is a brim curl 114 which aids in the consumption of the contents of the container. Secured to the bottom portion of the cylindrical side wall 112 is a bottom wall which is provided in a conventional manner.

Again, the container 100 is formed from a heat insulating stock material, particularly, stock material as illustrated in FIG. 5. The heat insulating stock material 120 includes a base layer 122 formed of a paperboard material and polymer film 124 which may be selectively adhered to the surface of the paperboard substrate 122. This sealing of the polymer 124 to the paperboard substrate 122 is carried out in a manner which as with the previous embodiment presents a plurality of enclosed regions 126 which entrap air within the regions. However, as can be appreciated from FIG. 5, the volume of the enclosed regions 126 is larger than that of the previous embodiment. The particular method for forming such enlarged enclosed regions 126 will be discussed in greater detail hereinbelow.

It is to be appreciated, as with the previous embodiment, that the paperboard substrate 122 includes a moisture and air impermeable coating 128, which as can be seen from FIG. 5, is applied to the same surface of the substrate 122 as the polymer film 124. While the impermeable coating 128 may be applied to the opposing surface as is illustrated in FIG. 2, by providing the impermeable coating 128 adjacent the polymer film 124, a better air retention in the enclosed regions is achieved and better adhesion of the polymer film 124 in the sealing areas 138 is realized. Further, if the impervious coating 128 is applied to the outer surface, it may be necessary to also apply an impervious coating to the inner surface to assure that the container formed from the stock material has a sufficient moisture barrier. However, this depends on which surface of the substrate 122 the polymer layer 124 is adhered to.

With reference to FIG. 6, a schematic representation of the method for forming the insulating stock material 120 is illustrated. As with the previous embodiment, the paperboard substrate 122 is provided between a metal chill roll 130 and a rubber back-up roll 132. Similarly, the polymer sheet 124 which may be provided in any conventional manner is extruded from the extruder 134. Again, like the previous embodiment, when extruded, the polymer film 124, which is preferably a polyethylene film, passes over a portion of the metal chill roll 130 to a nip region 136 formed between the metal chill roll 130 and the back-up roll 132. Additionally, the metal chill roll 130 includes recessed areas 140 which may be more defined than those of the chill roll 30 illustrated in connection with the previous embodiment thereby forming extended raised areas 142. As with the previous embodiment, the raised areas 142 provide a high-pressure bond between the polymer film 124 and the impermeable coating 128 in the nip region 136 formed between the metal chill roll 130 and the rubber back-up roll 132. Unlike the previous embodiment, FIG. 6 includes a blower 144 which directs air under pressure through a nozzle and impinges on the heated polymer film 124 in order to force the heated polymer film into the recessed areas 140 of the metal chill roll 130. In doing so, more pronounced and larger enclosed regions 126 are formed. Again, because the polymer material which is blown into the recess areas 140 is not subjected to high pressure as is the material adjacent the raised areas 142 of the metal chill roll 130 in the nip region 136, the material in the recessed areas 140 will not adhere to the impermeable coating 128, thus readily forming the above-noted enclosed regions 126. Again, the degree of adhesion between the polymer film 124 and the impermeable coating 128 in the sealed areas 138 can be controlled by the factors alluded to in connection to the previous embodiment. Particularly, these factors are controlled such that the polymer film 124 is not of a temperature which would permit the entire polymer film to inadvertently adhere to the impermeable coating 128. Further, the adhesion between the polymer film 124 and the moisture impermeable coating 128 must be of a degree which ensures the formation of the enclosed regions 126 in order to form the requisite heat insulating substrate.

As with the previous embodiment, the rubber back-up roll 132 may include raised areas thus applying pressure in the nip region 136 in selected areas. Further, both the metal roll 130 and the rubber back-up roll 132 may include such raised areas. The particular pattern formed in each roll will be dependent on the intended use of the insulating stock material. With respect to the rubber back-up roll 132, it is necessary that the roll be of sufficient hardness to receive and maintain the pattern when under pressure in the nip region 136. Again, because forming the pattern in the rubber back-up roll by laser engraving or other means is easier and less expensive than forming such pattern in a metal roll, the costs associated with the entire process may be reduced by using patterned rubber back-up rolls.

Figure 10:
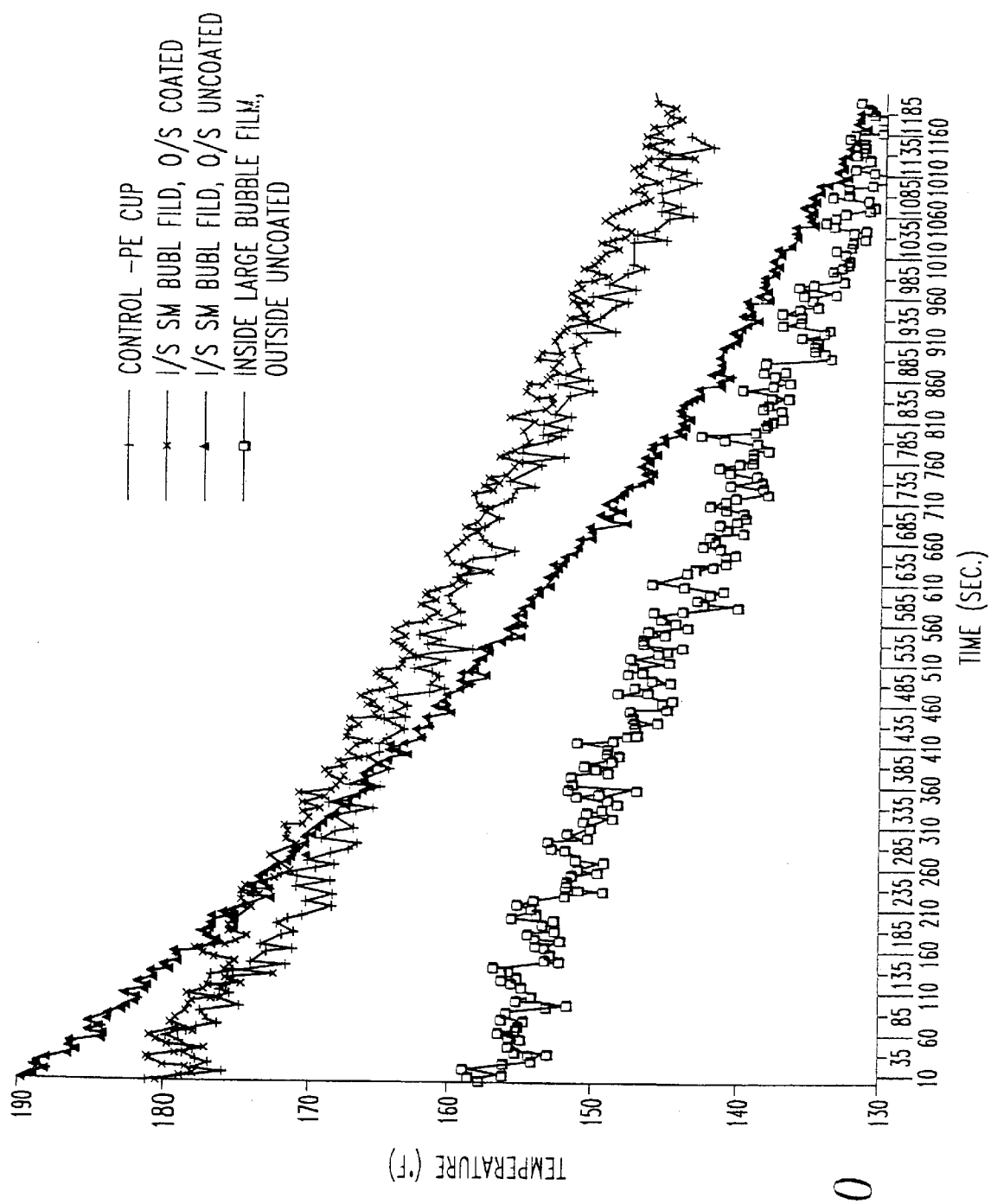
FIG. 10 is a graphic illustration of the advantages achieved in accordance with the present invention.

When the heat insulating stock material 120 is exposed to heat such as when the stock material is utilized to form the container 110 as illustrated in FIG. 1 and the container is filled with a hot liquid, the unbonded areas of the polymer film 124 of each of the enclosed regions 126 will expand with the expansion of the air provided in the air space between the paperboard substrate 122 and the polymer film 124 (or between the polymer film 124 and the impervious coating 128, depending on which surface the coating and polymer layers are applied) in the enclosed regions 126 along the inside wall of the container 110. This expansion provides heat insulating characteristics which maintains an outer surface of the container 110 at an acceptable temperature level even though the contents the container may reach a temperature as high as 180–200° F. This feature being best illustrated in FIG. 10 which is a graphical representation of sidewall temperatures of containers formed in accordance with the present invention as compared to that of conventional containers. As noted in FIG. 10, the upper surface of containers formed in accordance with the present invention having a large bubble film on the inside surface of the container exhibits a surface temperature of approximately 155° as compared to 190° for a conventional polyethylene coated cup. It is only after approximately 20 minutes of standing time that the temperature of the conventional polyethylene coated cup reaches that of the cup including a large bubble film on the inside surface of the container.

Again, as noted hereinabove, the container 110 can be formed from the insulating stock material such that the polymer film 124 and consequently the enclosed regions 126 are on an outside surface of the container 110.

Figure 7:
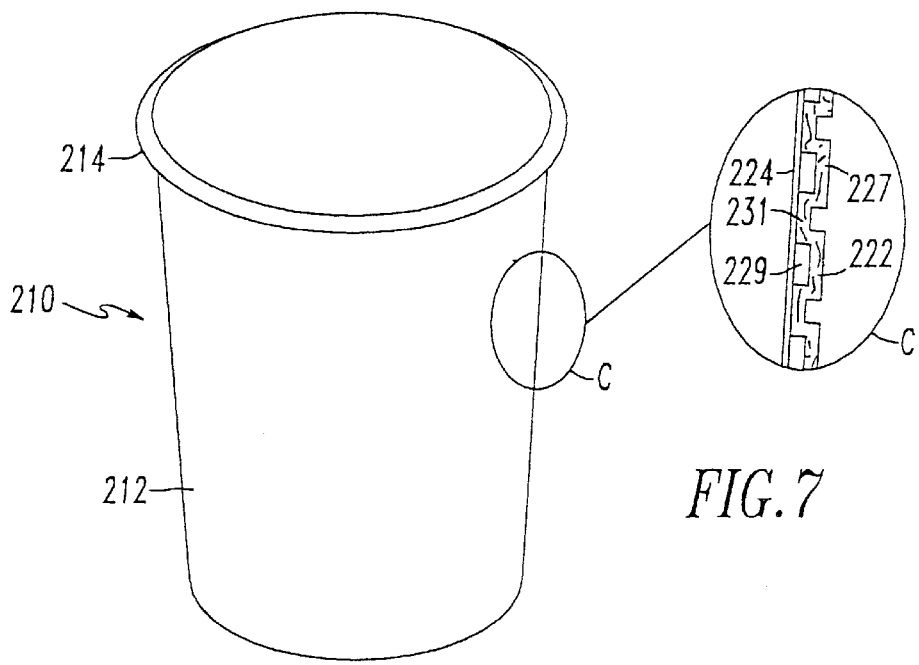
FIG. 7 is a partial cross-sectional view of a container formed in accordance with yet another alternative embodiment of the present invention.
Figure 9:
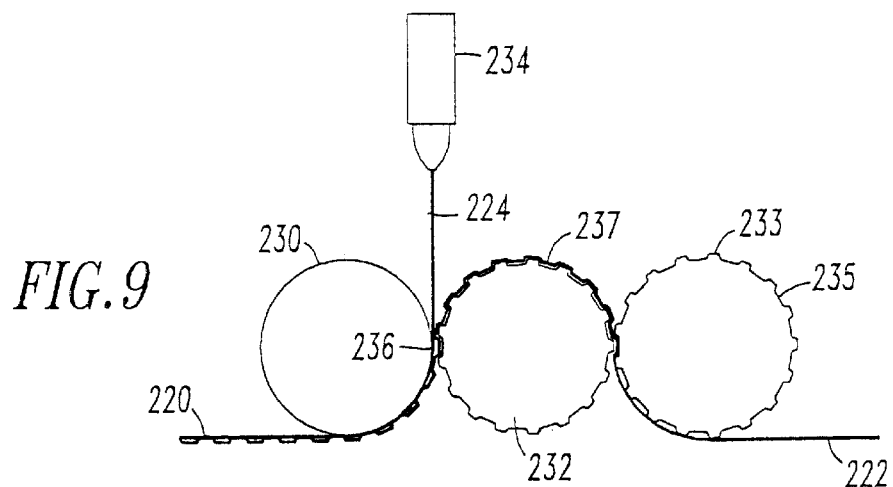
FIG. 9 is a schematic representation of the method used in forming the stock material of FIG. 8.
Figure 8:
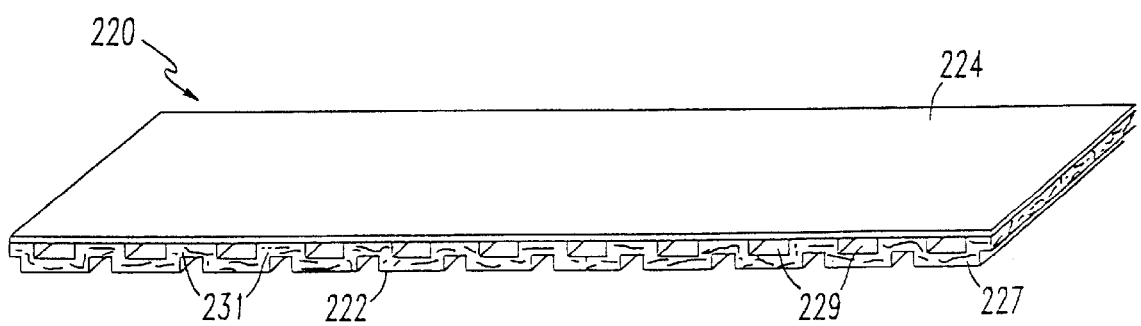
FIG. 8 is a cross-sectional perspective view of the stock material for manufacturing the container of FIG. 7 in accordance with the present invention.

Referring now to FIGS. 7, 8 and 9, and the still further alternative embodiment of the present invention is set forth therein. As with the previous embodiments, FIG. 7 illustrates a container 210 including side wall 212 tapering slightly inwardly from an upper perimeter thereof to the bottom of the container. About the upper periphery of the container 210 is a brim curl 214 which aids in the consumption of the contents of the container. Likewise, secured to the bottom portion of the cylindrical side wall 212 is a bottom wall which may be secured to the cylindrical side wall 212 in any known manner.

Again, the container 210 is formed of a heat insulating stock material which is best illustrated in FIG. 8. The heat insulating stock material 220 includes a base layer 222 formed of a paperboard material and a polymer film 224 which is adhered to raised portions 231 of the paperboard substrate 222. While not particularly illustrated in FIG. 8, the paperboard substrate 222 may include a moisture and air impermeable coating on either or both surfaces of the paperboard substrate.

With reference to FIG. 9, a schematic representation of the method of forming the heat insulating stock material 220 is illustrated therein. Like the previous embodiment, the paperboard substrate 222 is provided between a metal chill roll 230 and back-up roll 232, however, also provided is an embossing roll 233 including protuberances 235 which extend outwardly from a surface of the embossing roll 233 and which mate with female detents 237 formed in the back-up roll 232. While the back-up roll 232 preferably includes the female detents 237, the back-up roll may be a rubber back-up roll which cooperates with the protuberances 235 in order to form the debossed regions within the paperboard substrate. The debossed regions 227 are best illustrated in FIG. 8 and form air pockets 229 in the paperboard substrate 222. Once formed, the polymer film 224, which is extruded from the extruder 234 passes adjacent the metal chill roll 230 and is pressure sealed to the raised portions 231 of the paperboard substrate 222 in the nip region 236, thus forming the air pockets 229 which promote the heat-insulating characteristics of the stock material 220. Once again, the degree of adhesion between the polymer film 224 and the raised portions 231 of the paperboard substrate 222 may be controlled by a number of factors. As with the previous embodiments, these factors include the temperature of the polymer film being extruded from the extruder 234, the position of the extruded polymer film 224 with respect to the nip region 236 between the metal chill roll 230 and back-up roll 232, the nip pressure applied in the nip region 236, the particular temperature of the metal chill roll 230, the type of polymer material used, the surface treatment of the paperboard substrate 232 as well as the atmosphere surrounding the nip region 236. All of these factors must be taken into account when adhering to the polymer film 224 to the paperboard substrate 222. Again, it is clear that it is necessary that sufficient adhesion of the polymer film 224 to the raised regions 231 take place in order to properly form the air pockets 229. As noted hereinabove, the paperboard substrate 222 may include an impermeable coating which, would preferably, be applied to the surface of the paperboard substrate adjacent the polymer film 224 in order to promote the adhesion of the polymer film 224 to the substrate thereby forming the air pockets 229 between two impermeable layers.

Again, when the heat insulating stock material 220 is exposed to heat such as when the stock material is utilized to form the container 210 and the container is filled with a hot liquid, the portions of the polymer film 224 overlying the air pockets 229 will expand in response to the expansion of the air within the air pockets 229 thus providing the requisite heat insulating characteristics. Additionally, any configuration may be utilized in forming the debossed regions. Accordingly, a decorative debossed pattern may be provided on an outer surface of the container 210 in order to enhance the acceptability of the container by the consumer. Further, the rough textured surface will aid in the grasping of the container by the consumer.

Accordingly, as can be seen from the foregoing description, insulated stock materials and containers are set forth wherein the stock material can be manufactured in an economical manner such that the resultant containers formed from the insulating stock material provide the requisite insulating properties while adding insignificantly to the overall costs associated with the manufacture of such stock materials or containers.

While the present invention has been described in reference to preferred embodiments, it will be appreciated by those skilled in the art that the invention may be practiced otherwise than as specifically described herein without departing from the spirit and scope of the invention. It is, therefore, to be understood that the spirit and scope of the invention be only limited by the appended claims.

What is claimed is:

1. A method of forming an insulating container comprising the steps of:

providing a paperboard base layer having an inside surface and an outside surface;

applying an impervious coating on at least a portion of one of said inside surface and said outside surface of said base layer;

forming an insulating region by selectively adhering a polymer film to said inside surface of said paperboard base layer thereby forming a plurality of enclosed expandable regions adjacent said inside surface of said paperboard base layer; and forming said base layer having said impervious layer and said polymer film thereon into a container having at least one side wall and a bottom wall;

wherein said inside surface of said base layer forms an inside surface of said container and said polymer film expands in response to an expansion of air trapped in said enclosed regions in response to contact with a hot liquid.

2. The method as defined in claim 1, wherein said impervious coating is applied to an opposing surface of said paperboard base layer from said polymer film.

3. The method as defined in claim 1, wherein said impervious coating is applied to the same surface of said paperboard base layer as said polymer film and underlies said polymer film with said enclosed regions being formed between said polymer film and said impervious coating.

4. The method as defined in claim 1, further comprising the step of debossing said paperboard base layer to form debossed regions and positioning said polymer film over said debossed regions.

* * * * *